United States Patent
Yang et al.

(10) Patent No.: US 8,107,129 B2
(45) Date of Patent: Jan. 31, 2012

(54) METHODS AND APPARATUS FOR EMBEDDING AND DETECTING DIGITAL WATERMARKS IN A TEXT DOCUMENT

(75) Inventors: Bin Yang, Beijing (CN); Wenzhe Shi, Beijing (CN); Wenfa Qi, Beijing (CN); Shengyuan Cheng, Beijing (CN); Lidong Wang, Beijing (CN)

(73) Assignees: Peking University Founder Group Co., Ltd., Beijing (CN); Beijing Founder Electronics Co., Ltd., Beijing (CN); Peking University, Beijing (CN)

( * ) Notice: Subject to any disclaimer, the term of this patent is extended or adjusted under 35 U.S.C. 154(b) by 749 days.

(21) Appl. No.: 12/095,860

(22) PCT Filed: Apr. 29, 2006

(86) PCT No.: PCT/CN2006/000858
§ 371 (c)(1),
(2), (4) Date: Jun. 2, 2008

(87) PCT Pub. No.: WO2007/062554
PCT Pub. Date: Jun. 7, 2007

(65) Prior Publication Data
US 2008/0297853 A1    Dec. 4, 2008

(51) Int. Cl.
*H04N 1/405* (2006.01)
(52) U.S. Cl. .......................... 358/3.28; 358/1.9
(58) Field of Classification Search ................ 358/3.28, 358/1.9, 2.1, 3.06, 3.14, 3.2, 3.21, 3.11, 1.7, 358/1.11, 1.18; 382/100
See application file for complete search history.

(56) References Cited

U.S. PATENT DOCUMENTS

| | | | | |
|---|---|---|---|---|
| 6,108,434 A | * | 8/2000 | Cox et al. ...................... | 382/100 |
| 6,738,491 B1 | | 5/2004 | Ikenoue et al. | |
| 6,795,565 B2 | * | 9/2004 | Wendt .......................... | 382/100 |
| 7,266,216 B2 | * | 9/2007 | Braudaway et al. .......... | 382/100 |
| 2002/0054680 A1 | | 5/2002 | Huang et al. | |
| 2004/0090646 A1 | | 5/2004 | Saitoh et al. | |
| 2004/0150859 A1 | | 8/2004 | Hayashi | |
| 2005/0018845 A1 | | 1/2005 | Suzaki | |
| 2005/0169499 A1 | | 8/2005 | Rodriguez et al. | |
| 2006/0294382 A1 | * | 12/2006 | Krasinski ...................... | 713/176 |

FOREIGN PATENT DOCUMENTS

| | | |
|---|---|---|
| CN | 1547157 A | 11/2004 |
| JP | 06-178098 | 6/1994 |
| JP | 11-205579 | 7/1999 |
| JP | 2002-077587 | 3/2002 |
| JP | 2002-232688 | 8/2002 |
| JP | 2003-152987 | 5/2003 |

(Continued)

*Primary Examiner* — Thomas D Lee
*Assistant Examiner* — Stephen M Brinich
(74) *Attorney, Agent, or Firm* — Lowe Hauptman Ham & Berner LLP

(57) ABSTRACT

Disclosed are a method and apparatus for embedding or detecting watermarks in a text, which belong to the field of document protection. The method and apparatus overlay an additional layer of shade in a document for recording a large amount of information from watermarks. The shade comprises the dots arranged under certain rules. Shifts of the dots record each bit string within the watermark. According to the method and apparatus, a large amount of information can be embedded and the watermarks embedded in the shade are dispersed together with the document which can be digitized by a scanner for being detected.

23 Claims, 6 Drawing Sheets

FOREIGN PATENT DOCUMENTS

| | | |
|---|---|---|
| JP | 2004 128845 A | 4/2004 |
| JP | 2004-228896 | 8/2004 |
| JP | 2005 020436 A | 1/2005 |
| JP | 2005-057797 | 3/2005 |
| JP | 2005-123974 | 5/2005 |
| JP | 2005-277807 | 10/2005 |
| WO | WO 2004/084125 A1 | 9/2004 |
| WO | WO 2004/095828 A1 | 11/2004 |

* cited by examiner

METHODS AND APPARATUS FOR EMBEDDING AND DETECTING DIGITAL WATERMARKS IN A TEXT DOCUMENT

TECHNICAL FIELD

This invention refers to digital watermark technology, more particularly, to a method and apparatus for embedding or detecting digital watermarks in a text document.

BACKGROUND OF THE INVENTION

Text documents are stored in computers in a digital format and dispersed by printing, scanning, duplicating, etc. Actually, many paper documents (such as contracts and bills) are much more worthy than the multimedia such as an audio, a video and an image. As devices like computers, printers and scanners are applied and popularized, the copying and duplicating become relatively easy. As a result, the security of important text documents becomes an urgent requirement.

On the one hand, it is difficult to trace the source of a duplicated text document without any protection. For example, a duplicating machine, an indispensable auxiliary device in office automation devices, is especially notable and remarkable. Modern copy machines possess a high ability to make high quality copies with advanced functionality, some of which possess an intelligent editing capability and realize communication with other peers. Some advanced copy machines can so much as make a copy of banknote. Such copy machines can print various documents with high quality, which greatly reduces the work load of transcription and improves efficiency. However, this ability of the copy machines produces a problem for the security of important documents, that is, classified documents might be easily copied during transmission so as to lose the security. Then the copy machine becomes a convenient tool for leaking or stealing secrets. In recent years, most of the intercepted classified documents by the customs are copies from which the sources cannot be inspected. Therefore, criminals cannot be convicted. If some important information, such as the name of a person who prints, the name of the printer, the printing time, the physical address of the computer, and the like, can be detected from the paper documents, it will be easy to trace the source of the illegal transmission.

On the other hand, when a document is printed, some additional information is required, which is undesired to appear in the text of the document and desired to be re-entered when necessary, such as important private information on a bank bill, like credit line, deposit amount, and home address of a bank customer. Thus, a certain amount of information is required to be hidden, in advance, in the document to be printed. The information should not be identified by human eyes, but can be obtained conveniently by relevant scanning devices or specific reading tools when necessary. As a result, a large amount of iterative input is avoided, and lots of manpower, material resources and time are saved to a certain degree.

The above two problems are identical in essential, namely, a text document is used as a carrier to hide a certain amount of watermarks. When such a document is illegally duplicated and dispersed and a serious consequence is brought, said information can be used to trace the source of the crime. If the document is juggled willfully, said information can be used as the evidence of a prosecution for illegal invading.

To this end, a technology taking a digital image as a digital watermark to hide information is developed. Firstly, an image (such as a head portrait, a company log, a background pattern and the like) in a document is selected. A pre-entered information string is embedded in the image by a special process and the image is then output through a high-accuracy printer or printing device. When an original document is printed, scanned or duplicated, it is added with inestimable random noises which cannot be accurately described by a mathematical model and are related to the inherent performance of the devices such as printers, scanners and duplicating machines. Moreover, with respect to a printed image, the watermark is often distorted by rotation, binarization, over-migration, obvious warp, geometric transformation and so on. Although some processes can be made to the scanned image, the error rate of information identification remains high. In particular, the detection result for a text document duplicated for multiple times is unacceptable. Some people attempt to design the watermark according to the inherent feature of the text document, with the watermark embedded by changing the highly formatted file layout (such as letter shift or line shift) or the file format. However, this method also has serious defects. At first, a special process which is quite complicated is required in the anterior text edit and layout software. Secondly, in order to avoid impacting the effect of a normal document, the letter shift or line shift should not be too large. In this case, the scanned image suffers from the noises seriously all the same, and generally, the watermark is hard to be detected either. Thirdly, since the number of rows in a document is usually constant, the information which can be hidden is relative small. Finally, for a multi-page text, the method is more complicated.

In addition, this method depends on the contents in the document. If no image is contained in the document, the watermark has no carrier. Even if the carriers exist in the document, the image has to be copied from the document and processed specially when the watermark is hidden into the image. After laid out again, the image can be printed out. Besides, a high-resolution device is required during the printing in this method. Therefore, this method is not suitable for printing out documents in office.

In addition, a method for detecting the watermark as well as the operations of the corresponding device is as follow: scanning a document to be detected and an original document so as to obtain a corresponding image; pre-processing the image to compensate the influence caused by the factors such as attenuation, migration, zooming, obscuration and the like, in particular, salt-pepper noises and deflection which must be eliminated; and extracting the information hidden in the image based on the embedding method. This detecting method has relative strict requirements and a large amount of pre-processing. The accuracy of the pre-processing influences the detecting result directly. Moreover, the original image is needed in this method, which makes the detecting process complicated. Generally, since the conditions are quite strict, the identification rate is low, especially for the zoomed or duplicated document.

SUMMARY OF THE INVENTION

To overcome the shortcomings of the prior art, the present invention is to provide a method and apparatus for embedding or detecting digital watermarks in a text document. The method and apparatus can embed a layer of shade in the background of a normal document for recording an amount of information of watermarks. Even if the document embedding with a watermark is soiled, folded or zoom-duplicated, the watermark hidden in the document can also be detected with high accuracy.

To this end, the present invention provides a method for embedding a digital watermark in a text document, comprising:

(1) preparing an bitmap image constituted by dots, wherein shifts of those coding dots represent the watermark;

(2) obtaining the watermark and pre-processing the obtained watermark;

(3) embedding the pre-processed watermark in the bitmap image; and (4) printing the text document including the bitmap image embedded with the watermark.

Further, in the step (1), the bitmap image comprises at least one of AM screening dots, FM screening dots, FM-AM mixed screening dots, and designable dots.

Further, in the step (1), the bitmap image is pre-designed or generated dynamically based on certain rules and a gray level represented by the dots in the bitmap image is between 3% and 15%.

Further, in the step (1), the dots in the bitmap image are classified into: coding dots, whose shifting represent the watermark, wherein an interval between one coding dot and one adjacent other dot than the coding dot is of a size of 2 to 5 dots; anchor dots, which do not shift whenever the watermark is generated; and perturbing dots, which shift randomly during a coding process so as to prevent a coding manner from being broken and adjust visual effect of the bitmap image.

Further, the step (2) further comprises:

a. obtaining characters to be hidden, which form the watermark to be embedded;

b. transforming the characters into a binary bit string flow;

c. encrypting the binary bit string flow to generate a ciphertext bit string flow; and d. calculating a data-detecting check code based on the ciphertext bit string flow obtained in the step c, and then adding the check code to a front of the ciphertext bit string flow.

Further, in the step a, the characters comprise a user name, a user password, an MAC address of a network card, an IP address of a computer, printing time, a job name, a job ID, a user-defined character string or text information input from the text document.

In the step (2), a byte flow is inserted in a front of the bit string flow transformed from the characters for recording lengths of all character substrings.

In the step (3), some of the dots in the original bitmap image shift in eight different directions, respectively, for embedding the ciphertext bit string flow through shifts of the shifted dots.

Further, the step (4) further comprises: dividing one page of the text document into a plurality of units, each of which is corresponding to one bitmap image; rotating the bitmap image corresponding to each unit to 90, 180 or 270 degrees randomly; and mosaicking the rotated bitmap image corresponding to each unit to form a background shade of the page.

In the step (4), the text document is output and stored in a memory; when the background shade of one page is available, the corresponding part of the stored document is output from the memory to combine with the background shade; the document combined with the background shade is retranslated by a Page Description Language and then output to a corresponding Page Description File for printing.

An apparatus for embedding a digital watermark in a text document, comprises:

a capture device configured to capture computer data to be processed, transform the computer data into a bit string flow according to data codes retrieved from a memory, and encrypt the bit string flow to generate a ciphertext bit string flow;

an embedding device configured to receive and divide the ciphertext bit string flow into a certain number of substrings in light of bits of the ciphertext bit string flow, and hide a watermark represented by all the substrings in a selected bitmap image by shifting dots of the bitmap image;

a shade-generation device configured to mosaic a plurality of the bitmap images, each of which is embedded with the watermark, to generate a background shade of a page; and a printing device configured to receive the background shade, incorporate the text document with the background shade containing a plurality of the watermarks into a Page Description File, and then print out the Page Description File.

Further, the computer data comprises words, digits, characters, letters, as well as other information capable of being digitized, including video information and/or audio information.

The shade-generation device is further equipped with a device for generating warning text information on the background shade.

A method for detecting a digital watermark in a text document, comprises:

(1) obtaining one of a plurality of digital images in the text document by scanning or extracting the text document containing the watermark;

(2) obtaining a ciphertext bit string flow by processing the obtained digital image; and (3) decrypting the ciphertext bit string flow by using a special key to obtain an character string.

Further, in the step (2), a rotation angle and a zoom scale of the obtained digital image are calculated by identifying anchor dots in the obtained digital image containing the watermark.

In the step (2), each of coding dots in the obtained digital image is scanned, a shift of each of the coding dots is calculated based on a rotation angle and a zoom scale of the scanned digital image to obtain substrings which are to be combined into a bit string flow.

In the step (2), the anchor dots in the plurality of digital images are scanned so as to use shifts of coding dots in one of the image to compensate drop-out of shifts of coding dots in another image, which is caused by foreground contents or interference factors of the document.

In the step (3), a byte flow for storing check data is extracted from a front of the ciphertext bit string flow, and a data-checking algorithm is applied to check validity of the ciphertext bit string flow.

In the step (3), the special key is used to decrypt the ciphertext bit string flow in which the check data has been removed so as to obtain a plaintext bit string flow, lengths of fields in the plaintext bit string flow are respectively extracted, and the character string constituted by all of the fields are then obtained in turn.

An apparatus for detecting a watermark in a text document, comprises:

a text-digitizing device configured to scan the document containing a shade to obtain a digital image in the document;

an image-identifying device configured to obtain a ciphertext bit string flow by processing the digital image;

an information-decrypting device configured to decrypt the ciphertext bit string flow by using a special key so as to obtain an character string.

Further, the image-identifying device comprises: a sampling device configured to select a strip-shaped area in a center portion of the image and calculate an interval of gray levels of pixels as well as radiuses of dots; and a pre-processing device configured to calculate a rotation angle and a zoom scale of the image.

The present invention has the following effects. According to the method and apparatus provided in the invention, the amount of the information embedded in the shade of a document is increased and the watermark embedded in the shade is dispersed together with the document. The document can be digitized by a scanner for being detected. Since an error-correcting coding technology is applied in the process for generating the shade of the present invention, the hidden watermark can be detected with high accuracy, even the document is soiled, folded or zoom-duplicated. Therefore, the present invention can widely used for encrypting or tracing a document, controlling the illegal dispersion of a document and protecting the copyright of a document.

DETAILED DESCRIPTION

Hereafter, embodiments of the present invention will be described with reference to accompanying drawings.

Figure 7:
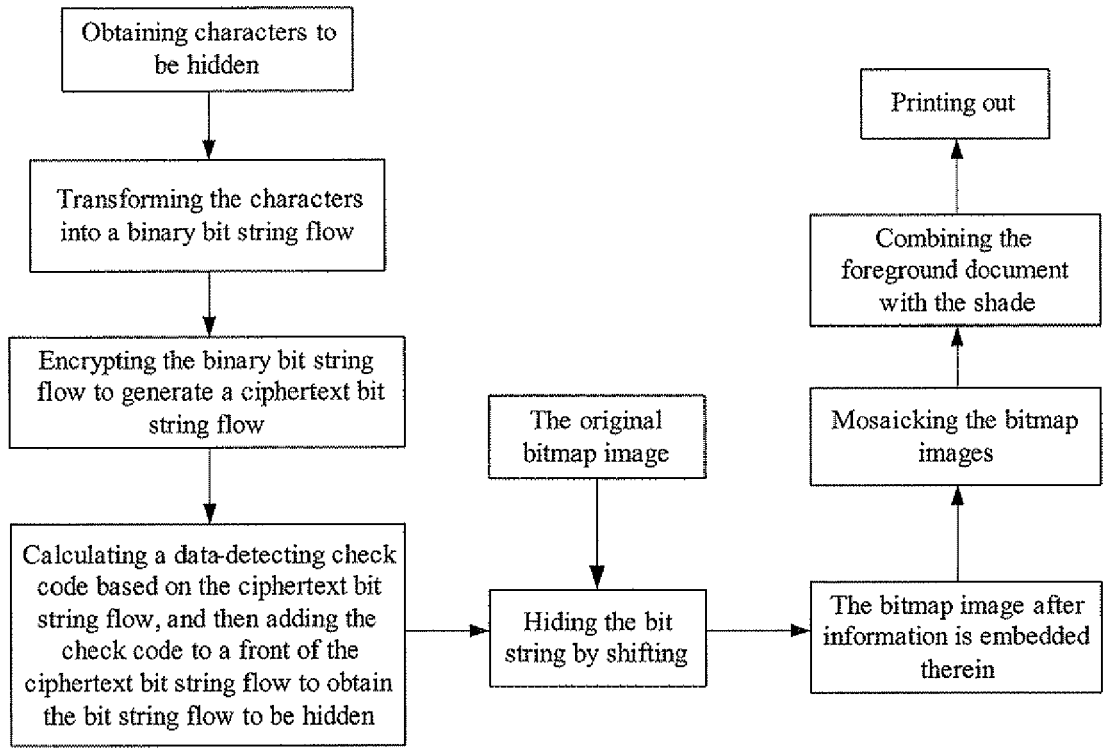
FIG. 7 is a schematic diagram of a process for embedding watermarks.

As shown in FIG. 7, a method for embedding a digital watermark in a text document comprises the following steps.

(1) Step 1 is to prepare a bitmap image constituted by dots, wherein shifts of those coding dots represent the watermark.

Figure 3:
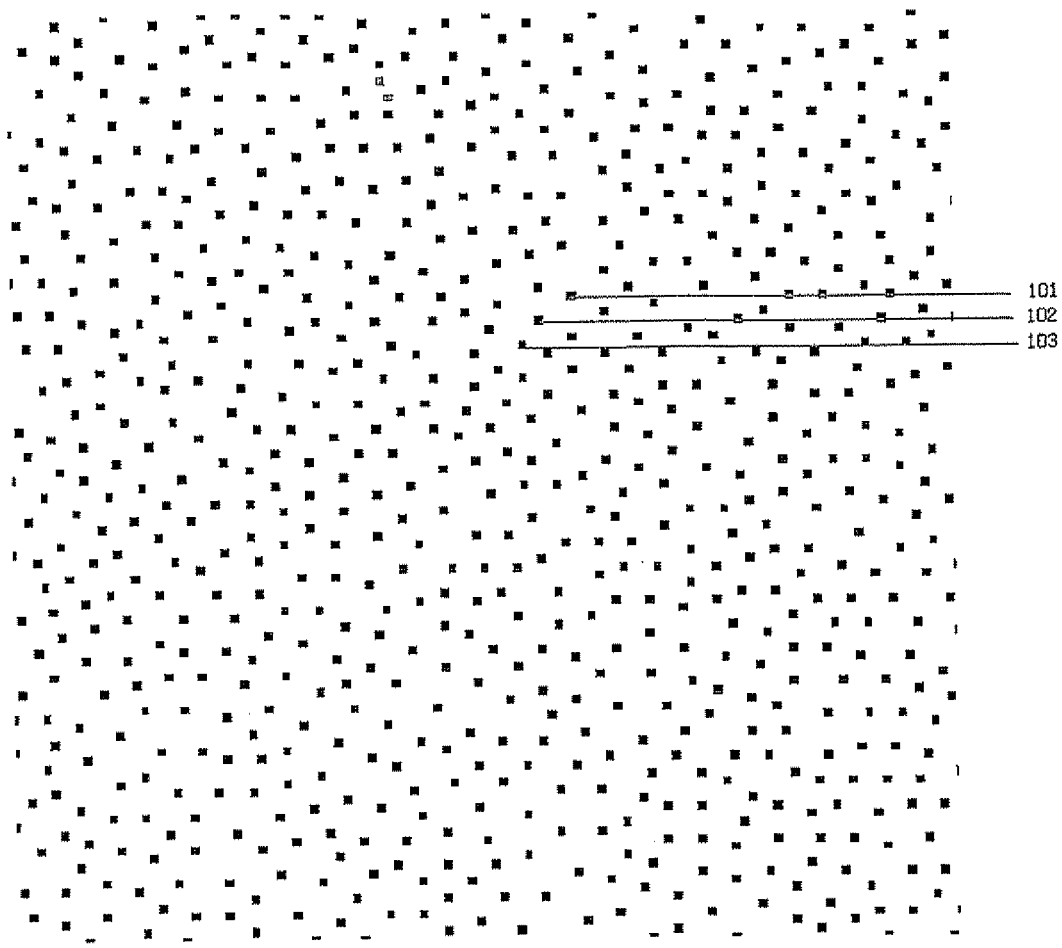
FIG. 3 is a schematic diagram of an original bitmap image.

The original bitmap image of the present invention may comprise amplitude-modulation (AM) screening dots, frequency-modulation (FM) screening dots, FM-AM mixed screening dots, and designable dots. The bitmap image may be pre-designed or generated dynamically based on certain rules. In this embodiment, a pre-designed set of circle dots formed by FM screening are selected. The gray level represented by the dots is 6% (generally, the dots with a gray level of 3%-15% are preferable). A partially enlarged view of the original bitmap image is shown in FIG. 3. All the dots can be sorted into three types: coding dots, anchor dots and perturbing dots. The shifts in positions of the coding dots 101 represent the watermark to be embedded. Whenever the watermark is generated, the anchor dots 102 do not shift in position. The shifts in positions of the perturbing dots 103 are random, which does not represent the watermark. Mostly, the shifts in positions of the perturbing dots 103 improve the visual effect impacted by after the shifts of the coding dots. Besides, the shifts of the perturbing dots 103 avoid the regularity of the coded bitmap image. Therefore, the coded bitmap images from the same original bitmap image are not identical, even though the same watermark is embedded. Moreover, due to the inherent randomicity of the FM dots, it is hard to obtain the characteristics of motion of the coding dots representing the watermark by analyzing, thereby the security being improved in a certain extent.

(2) Step 2 is to obtain the watermark and pre-process the obtained watermark.

Figure 1:
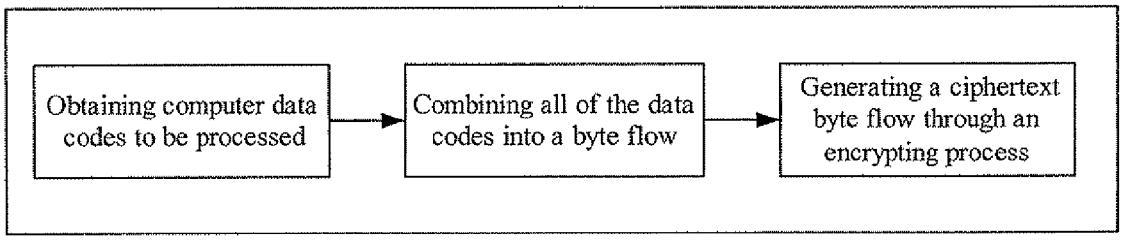
FIG. 1 is a schematic diagram of a process for obtaining and processing information.

As shown in FIG. 1, a printer driver reads a user name of a computer, a Medium Access Control (MAC) address of a network card, an IP address of the computer, time of printing a document, printing date, a job name, all or a part of a job ID, user-entered passwords obtained from a GUI user interface of a driver, a user-defined character string or text information read from any other text document. For example, the information of the character string to be embedded in this embodiment is as follow:

user name: "SuperMan";
MAC address: "00-0F-1F-CC-15-D7";
IP address of the computer: "172.16.8.102";
printing time: "2005-10-24";
job name: "secret document.doc";
user-defined character string: "Do not reveal the information recorded in this document, or bear your own consequence."

All the above character substrings are combined into a character string. Then, the data codes corresponding to each character are read from the memory of the computer so as to obtain a binary bit string flow (constituted by 0 and 1). For convenient decoding, a byte flow with a certain size is inserted into the front of the bit string flow to record the length of each of the above character substrings. For the sake of security, the combined bit string flow is encrypted with a key which acting as a plain code is inserted into the front of the byte flow. When detection is performed, authentication is required to verify whether the key entered by a user is identical to a read plain-code key. If the authentication is passed, a detecting program decrypts the read ciphertext bit string flow by using the key so as to obtain the original plaintext bit string flow. Otherwise, information in the ciphertext byte flow cannot be identified even if both of the document and the detecting program are known. Subsequently, a general data check algorithm is applied to the encrypted ciphertext byte flow to calculate checking data. Herein, the Cyclic Redundancy Check (CRC) code is selected to calculate a 16-bit check code and the check code is then added to the front of the ciphertext bit string flow so as to form a bit string flow to be hidden. The check code is mainly to check the correctness of data during the detection. Actually, there are two plain code byte flows (i.e. the key and the data check code) in the front of the ciphertext byte flow.

(3) Step 3 is to embed the pre-processed watermark in the bitmap image.

Figure 2:
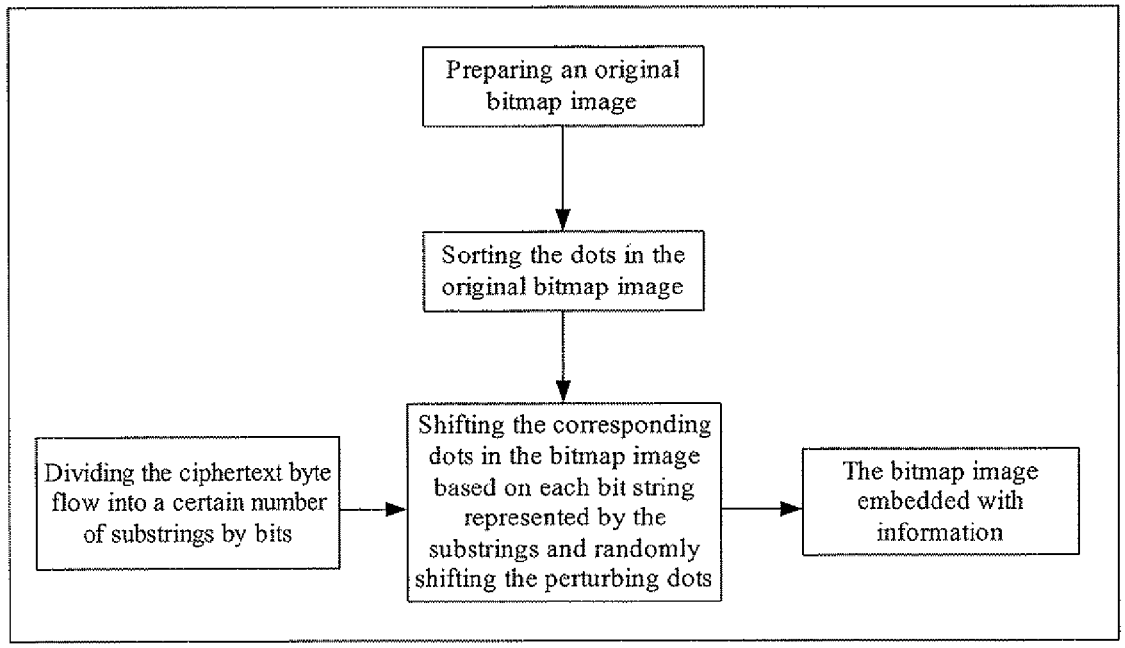
FIG. 2 is a schematic diagram of a process for embedding information.
Figure 4:
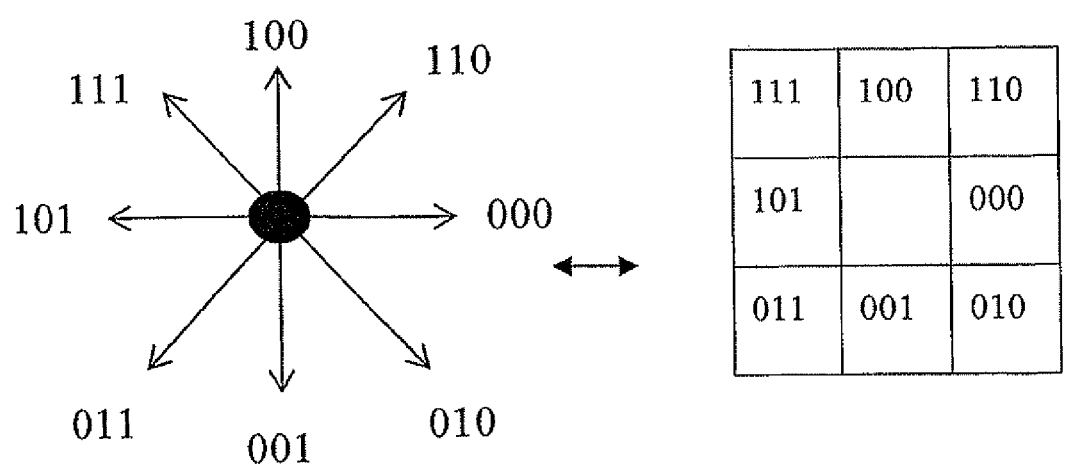
FIG. 4 is a schematic diagram illustrating the shifts of dots for coding.

Referring to a flow chart of the process of embedding a watermark as shown in FIG. 2, the ciphertext bit string flow is firstly divided into a certain number of substrings in light of bits of the ciphertext bit string flow. It is shown in FIG. 4 that the shift of each dot reflects three bits, according to the coding process in the present invention. That is, one byte of the coding information should be represented by the shifts of three dots. Since the shifts of three dots represent nine bits of information, the last bit is residual and used as a parity-checking bit. Of course, this bit can represent other information for the requirements of the coding process. In this embodiment, the whole ciphertext bit string flow is divided by byte and each byte is attributed by three coding dots of which the first two coding dots represent the first six bits of the byte. The first two bits of the three bits represented by the third coding dot are the last two bits of the byte, while the third bit of those acts as a parity-checking bit.

Based on the number of the divided substrings, a corresponding number of coding dots are selected. Each of these coding dots shifts in accordance with FIG. 4. After all the substrings represent the shifts of the coding dots. After all the coding dots having shifted, a new bitmap image is obtained. As a basic component of the shade, the new bitmap image has already hidden the obtained character strings.

(4) Step 4 is to print the text document including h the bitmap image embedded with the watermark.

A plurality of bitmap images formed in the step (3) are mosaicked into a large background shade whose size is determined by the page information of normal data. In this embodiment, a normal size of A4 is chosen. During mosaicking, various mosaicking manners can be chosen according to specific requirements of a print driver. The simplest method is to copy the unit bitmap image in multiple to perform matrix-liked mosaicking directly. The primary problem of this mosaicking method is the relatively large regularity. In order to solve this problem, the method of the present invention is as follow: dividing one page of the text document into a plurality of units, each of which is corresponding to one bitmap image; rotating the bitmap image corresponding to each unit to 90, 180 or 270 degrees randomly; and mosaicking the rotated bitmap image corresponding to each unit to form a background shade of the page. Processed as above, the regularity of the shade is reduced significantly. Finally, the mosaicked background shade is printed out.

Figure 5:
FIG. 5 is a schematic diagram of a document embedding with information.
Figure 6:
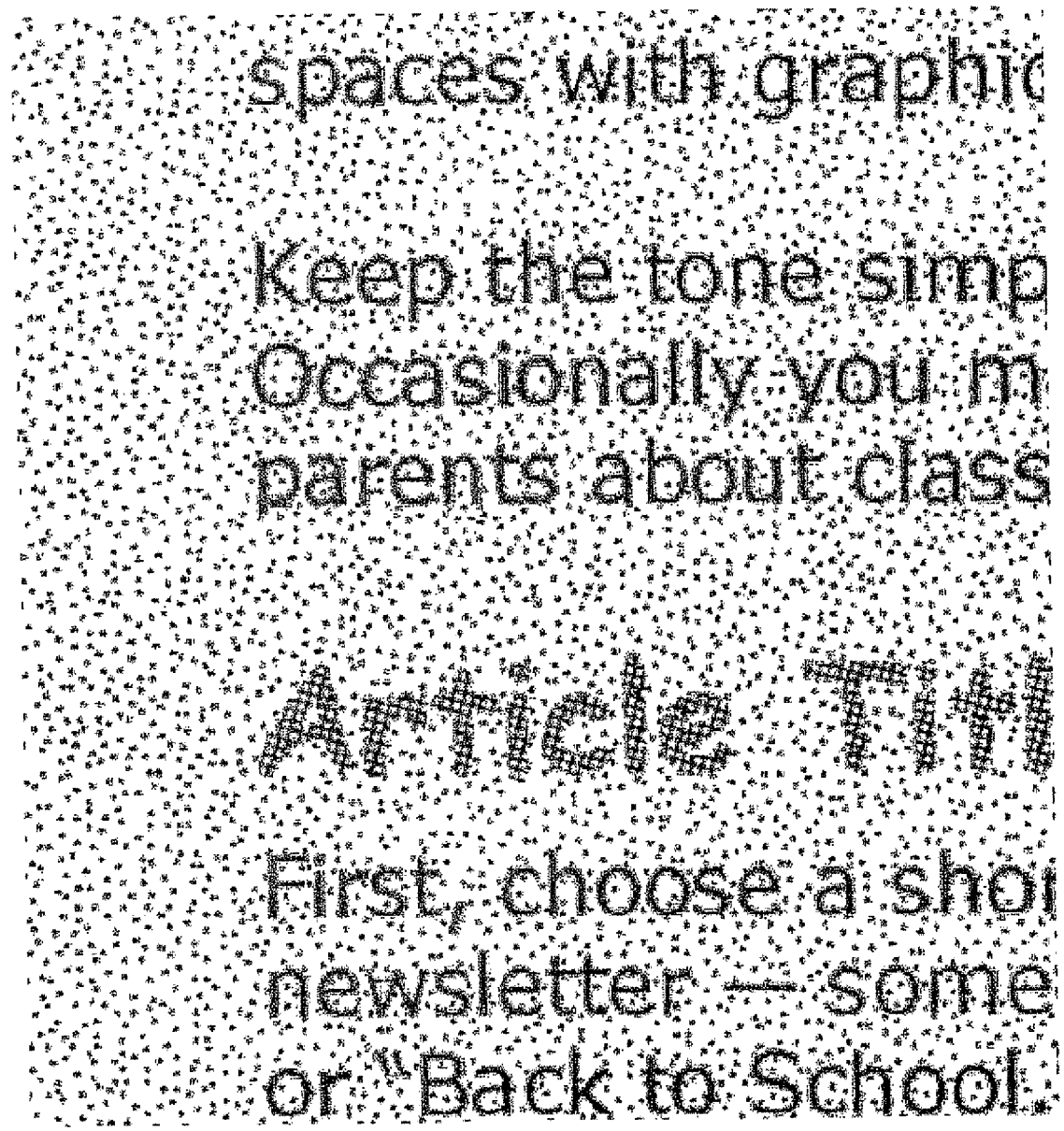
FIG. 6 is a partially enlarged view of FIG. 5.

During the printing process, the text document is output and stored in a memory. When the background shade of one page is available, the corresponding part of the stored document is output from the memory to combine with the background shade. Then, the document combined with the background shade is retranslated by a Page Description Language and output to a corresponding Page Description File. Finally, the Page Description File is sent to a print controller and printed out. The printing effect of the above process is shown in FIG. 5. A partially enlarged view of FIG. 5 is shown in FIG. 6. Since a plurality of watermarks are embedded in multiple places in the mosaicked bitmap images, a whole data block can be obtained with the compensation of other data blocks to overcome the soilage of a certain part of the shade and the impact of foreground characters.

Figure 8:
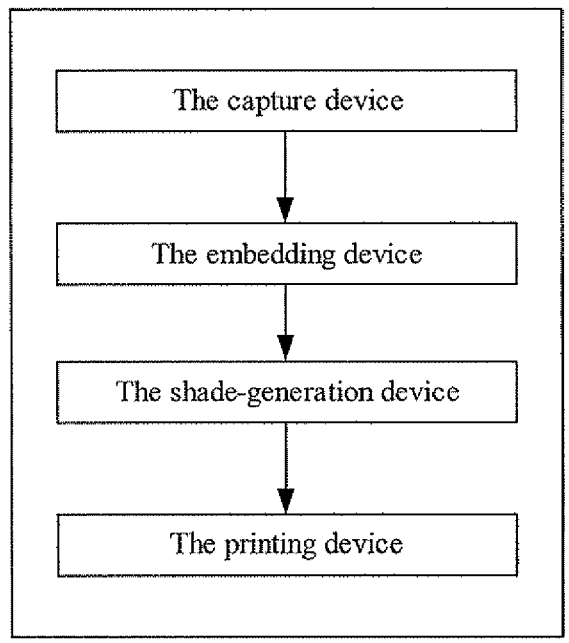
FIG. 8 is a schematic diagram of a device for embedding watermarks.

An apparatus for embedding a digital watermark in a text document, according to the above steps, comprises: a capture device, an embedding device, a shade-generation device, and a printing device, of which a schematic diagram is shown in FIG. 8.

(a) The capture device is configured to capture computer data to be processed, transform the computer data into a bit string flow according to data codes retrieved from a memory, and encrypt the bit string flow to generate a ciphertext bit string flow.

(b) The embedding device is configured to receive and divide the ciphertext bit string flow into a certain number of substrings in light of bits of the ciphertext bit string flow, and hide a watermark represented by all the substrings in a selected bitmap image by shifting dots of the bitmap image.

(c) The shade-generation device is configured to mosaic a plurality of the bitmap images, each of which is embedded with the watermark, to generate a background shade of a page.

(d) The printing device is configured to receive the background shade, incorporate the text document with the background shade containing a plurality of the watermarks into a Page Description File, and then print out the Page Description File.

The computer data comprises words, digits, characters, letters, as well as other information capable of being digitized, including video information and/or audio information. The shade-generation device is further equipped with a device for generating warning text information on the background shade. After a bitmap image generated by the device for generating a shade is printed, the warning text information hidden on the background shade is difficult to be identified by naked eyes. However, after the bitmap image is duplicated, the warning text information can come to light clearly so that the illegal reprography is avoided.

Figure 9:
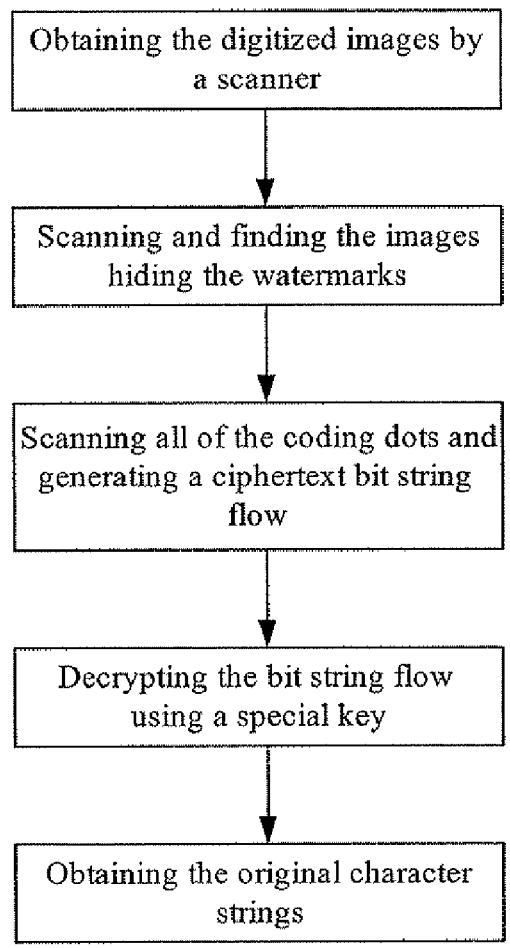
FIG. 9 is a schematic diagram of a process for detecting the watermarks.
Figure 10:
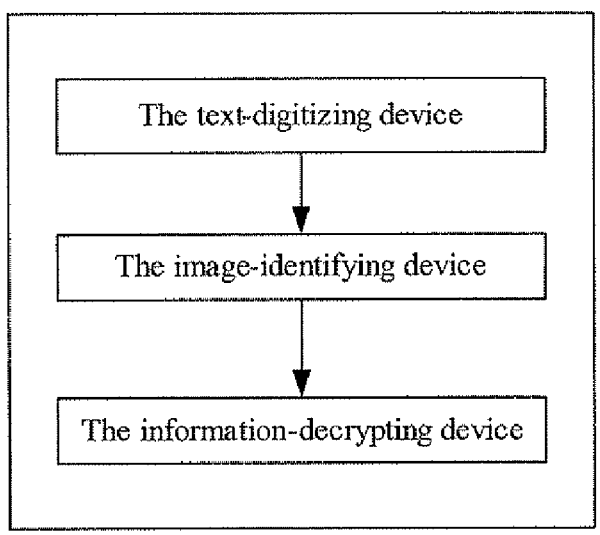
FIG. 10 is a schematic diagram of a device for detecting the watermarks.

As shown in FIG. 9, a method for detecting a digital watermark in a text document comprises the following steps.

(1) Step 1 is to obtain one of a plurality of digital images in the text document by scanning or extracting the text document containing the watermark.

For the detection of a digital watermark hidden in the shade of a text document, the text document is digitized by an image-inputting or image-extracting device (a scanner or a digital camera). The obtained digital image contains at least one encrypted digital watermark.

(2) Step 2 is to obtain a ciphertext bit string flow by processing the obtained digital image.

This step is performed mainly by an independent application program running on the computer. The program is used to deal with the digital image obtained by scanning. After the image is input by the program, the user is asked to enter a key, which is to be stored in the memory temporarily. Due to some subjective or objective reasons, the document is usually inclined or zoomed to a certain extent during being scanned or duplicated. Moreover, it is probable for the document to suffer the dot expansion and distortion resulted from multiple duplications. The detecting of the embedded watermark may be impacted due to the above factors. In order to identify the hidden information accurately, a rotation angle and a zoom scale of the obtained digital image should be detected by identifying anchor dots in the obtained digital images containing the watermark and the scanning result should be compensated to a certain degree. Then, the entire image is scanned with the detection program. If a dot acting as the starting dot of a bitmap image is identified, it is indicated that an image or a part of an image is detected. Since all the coding dots are shifted during the embedding process, the theoretic locations of the coding dots are in blank areas. Then, the search for the coding dots is performed in the areas adjacent to the theoretic locations. Comparing the actual location of each of the coding dots with its corresponding theoretic location, the information of the bit string represented by the coding dot is determined. After all the coding dots are processed, a bit string flow is obtained and then converted to a byte flow with a shifting operation. A plain-code key with a fixed length is extracted from the front of the byte flow. The validity of the entire ciphertext byte flow is checked based on the data-checking code in the end of the byte flow. If the data checking is passed, a key entered by the user is compared with the key extracted from the byte flow. If the authentication is passed, the ciphertext byte flow is decrypted with the key, so that all the hidden information is identified.

Due to the impact of the normal foreground contents of the document, in many cases, any one image containing an intact watermark cannot be founded, after the entire document is scanned. At this time, the anchor dots in a plurality of images are needed to be scanned. Then the shifts of coding dots in one of the images are used to compensate drop-out of the shifts of the coding dots in another image, which is caused by interference of the foreground contents, thereby the identification rate for information being further improved.

(3) Step 3 is to decrypt the ciphertext bit string flow by using a special key to obtain an original character string.

Before the decrypting operation, the information for checking data is extracted from a byte in the front of the ciphertext bit string flow, and a data-checking algorithm is applied to check the validity of the ciphertext bit string flow. Subsequently, the special key is used to decrypt the ciphertext bit string flow in which the check data has been removed so as to obtain a plaintext bit string flow, lengths of fields in the plaintext bit string flow are respectively extracted, and the character string constituted by all of the fields are then obtained in turn.

An apparatus for detecting a watermark in a text document, according to the above steps, comprises:

a text-digitizing device configured to scan the document containing a shade to obtain a digital image in the document;

an image-identifying device configured to obtain a ciphertext bit string flow by processing the digital image;

an information-decrypting device configured to decrypt the ciphertext bit string flow by using a special key so as to obtain an character string.

The image-identifying device comprises: a sampling device for a specified area in an image and a pre-processing device for an image. The sampling device is capable of selecting a strip-shaped area in a center portion of the image and calculating an interval of gray levels of sampled pixels as well as corresponding radiuses of dots. The pre-processing device is capable of calculating a rotation angel and a zoom scale of the image based on the result of sampling.

A large amount of information can be embedded in the bitmap image according to the present invention, which has strong ability of anti-duplication. The watermark can be detected accurately from a document even being duplicated for five times. The method of the present invention is on the basis of dot-level coding other than the information embedding of pixels. As a result, according to the present invention, the watermark can be detected even the image is zoomed with a certain scale. Therefore, the most notable advantage of the present invention is that a document having the watermark hidden in the shade is prevented from zoom duplication.

The above embodiments are preferable embodiments of the present invention. It is possible for those skilled in the art to obtain other embodiments without departing from the spirit of the present invention, wherein another type of the bitmap image may be used as the original bitmap image, such as a bitmap image generated by FM screening or any regular or irregular bitmap image designed as desired, which are constituted by dots;

another coding method may be applied, such as a method in which the dots shifting by various distances represent various bit string, and the decomposition mode of a bit string may be changed, for example, to represent "0" or "1" according to a certain rule;

any character string may be hidden, including any character flows read from documents with other text formats, such as *.dot, *.txt, and the like; and another method for checking validity of bit string flow may be applied, such as the parity checking method or other checking method using cyclic codes.

The invention claimed is:

1. A method for embedding a digital watermark in a text document, comprising:

(1) preparing a bitmap image constituted by dots, wherein the dots comprise coding dots;

(2) obtaining the watermark and pre-processing the obtained watermark;

(3) embedding the pre-processed watermark in the bitmap image, wherein the pre-processed watermark is represented by the shifts in positions of the coding dots; and (4) printing the text document including the bitmap image embedded with the watermark.

2. The method of claim 1, wherein, in the step (1), the dots in the bitmap image are classified into:

the coding dots, whose shifting represent the watermark, wherein an interval between one coding dot and one adjacent dot other than the coding dot is of a size of 2 to 5 dots;

anchor dots, which do not shift whenever the watermark is generated; and perturbing dots, which shift randomly during a coding process so as to prevent a coding manner from being broken and adjust visual effect of the bitmap image.

3. The method of claim 2, wherein, the step (2) further comprises:

a. obtaining characters to be hidden, which form the watermark to be embedded;

b. transforming the characters into a binary bit string flow; and c. encrypting the binary bit string flow to generate a ciphertext bit string flow.

4. The method of claim 3, wherein the characters comprise a user name, a user password, an MAC address of a network card, an IP address of a computer, printing time, a job name, a job ID, a user-defined character string or text information input from the text document.

5. The method of claim 3, wherein, the step (2) further comprises:

d. calculating a data-detecting check code based on the ciphertext bit string flow obtained in the step c, and then adding the check code to a front of the ciphertext bit string flow.

6. The method of claim 3, wherein, in the step (2), a byte flow is inserted in a front of the bit string flow transformed from the characters for recording lengths of all character substrings.

7. The method of claim 6, wherein, in the step (3), some of the dots in the original bitmap image shift in eight different directions, respectively, for embedding the ciphertext bit string flow through shifts of the shifted dots.

8. The method of claim 2, wherein the step (4) further comprises dividing one page of the text document into a plurality of units, each of which is corresponding to one bitmap image;

rotating the bitmap image corresponding to each unit to 90, 180 or 270 degrees randomly; and mosaicking the rotated bitmap image corresponding to each unit to form a background shade of the page.

9. The method of claim 8, wherein, in the step (4), the text document is output and stored in a memory; when the background shade of one page is available, the corresponding part of the stored document is output from the memory to combine with the background shade; the document combined with the background shade is retranslated by a Page Description Language and then output to a corresponding Page Description File for printing.

10. The method of claim 2, wherein, in the step (1), the bitmap image comprises at least one of AM screening dots, FM screening dots, FM-AM mixed screening dots, and designable dots.

11. The method of claim 2, wherein, in the step (1), a gray level represented by the dots in the bitmap image is between 3% and 15%.

12. An apparatus for embedding a digital watermark in a text document, comprising:
- a capture device configured to capture computer data to be processed, transform the computer data into a bit string flow according to data codes retrieved from a memory, and encrypt the bit string flow to generate a ciphertext bit string flow;
- an embedding device configured to receive and divide the ciphertext bit string flow into a certain number of substrings in light of bits of the ciphertext bit string flow, and hide the watermark formed by all the substrings in a selected bitmap image, the watermark represented by shifting positions of coding dots of the bitmap image;
- a shade-generation device configured to mosaic a plurality of the bitmap images, each of which is embedded with the watermark, to generate a background shade of a page; and
- a printing device configured to receive the background shade, incorporate the text document with the background shade containing a plurality of the watermarks into a Page Description File, and then print out the Page Description File.

13. The apparatus of claim 12, wherein, the computer data comprises words, digits, characters, letters, as well as other information capable of being digitized, including video information and/or audio information.

14. The apparatus of claim 12, wherein, the shade-generation device is further equipped with a device for generating warning text information on the background shade.

15. The apparatus of claim 13, wherein, the shade-generation device is further equipped with a device for generating warning text information on the background shade.

16. A method for detecting a digital watermark in a text document, comprising:
(1) obtaining one of a plurality of digital images of the text document by scanning or digitizing the text document containing the watermark, the watermark represented by coding dots whose positions are moved;
(2) obtaining a ciphertext bit string flow by processing an obtained digital image, a shift in position of each of the coding dots is calculated based on a rotation angle and a zoom scale of the scanned or digitized digital image to obtain substrings which are to be combined into a bit string flow; and
(3) decrypting the ciphertext bit string flow by using a special key to obtain a character string forming the watermark.

17. The method of claim 16, wherein, in the step (2), the rotation angle and zoom scale of the obtained digital image are calculated by identifying anchor dots in the obtained digital image of the text document containing the watermark.

18. The method of claim 17, wherein, in the step (2), the anchor dots in the plurality of digital images are scanned so as to use shifts in position of coding dots in one of the images to compensate for drop-out of shifts of coding dots in another image, which is caused by foreground contents or interference factors of the document.

19. The method of claim 16, wherein, in the step (3), a byte flow for storing check data is extracted from a front of the ciphertext bit string flow, and a data-checking algorithm is applied to check validity of the ciphertext bit string flow.

20. The method of claim 19, wherein, in the step (3), the special key is used to decrypt the ciphertext bit string flow in which the check data has been removed so as to obtain a plaintext bit string flow, lengths of fields in the plaintext bit string flow are respectively extracted, and the character strings constituted by the fields are then obtained in turn.

21. The method of claim 16, wherein, in the step (2), anchor dots in the plurality of digital images are scanned so as to use shifts in position of coding dots in one of the images to compensate for drop-out of shifts of coding dots in another image, which is caused by foreground contents or interference factors of the document.

22. An apparatus for detecting a watermark in a text document, comprising:
- a text-digitizing device configured to scan the document containing a shade to obtain a digital image of the document, the digitized image containing coding dots whose positions have been shifted;
- an image-identifying device configured to obtain a ciphertext bit string flow by processing the digital image, wherein the image-identifying device scans each of the coding dots and a shift in position of each of the coding dots is calculated based on a rotation angle and a zoom scale of the scanned digital image to obtain substrings that are combined to form the ciphertext bit string flow;
- an information-decrypting device configured to decrypt the ciphertext bit string flow by using a special key so as to obtain a character string forming the watermark.

23. The apparatus of claim 22, wherein, the image-identifying device further comprises:
- a sampling device configured to select a strip-shaped area in a center portion of the image and calculate an interval of gray levels of pixels as well as radiuses of dots; and
- a pre-processing device configured to calculate a rotation angle and a zoom scale of the image.

* * * * *